United States Patent [19]

Greblunas

[11] 3,811,078
[45] May 14, 1974

[54] DC MOTOR DRIVE SYSTEM FOR WINDING REEL

[75] Inventor: Joseph A. Greblunas, Scotia, N.Y.

[73] Assignee: General Electric Company, Salem, Mass.

[22] Filed: Nov. 28, 1972

[21] Appl. No.: 310,126

[52] U.S. Cl. .................................. 318/99, 318/6
[51] Int. Cl. ............................................. H02p 7/74
[58] Field of Search ...................... 318/6, 98–100

[56] References Cited
UNITED STATES PATENTS

| | | |
|---|---|---|
| 1,708,870 | 4/1929 | Bushman ........................ 318/99 |
| 2,310,098 | 2/1943 | Lessmann ..................... 318/99 X |
| 3,275,918 | 9/1966 | Taylor ............................. 318/99 |
| 2,182,631 | 12/1939 | Kenyon ...................... 318/100 X |
| 3,596,155 | 7/1971 | Huxtable ....................... 318/100 |
| 823,220 | 6/1906 | Jackson ...................... 318/98 X |
| 3,018,978 | 1/1962 | Graneau et al. ................ 318/6 X |

Primary Examiner—T. E. Lynch
Attorney, Agent, or Firm—Arnold E. Renner; Harold H. Green, Jr.

[57] ABSTRACT

A DC motor drive system for driving a winding reel at constant horsepower over a wide range of speeds. Two or more main drive motors and one or more auxiliary drive motors are series connected in a power supply circuit. The field circuits of the main and auxiliary motors are separately controlled in a programed manner to extend the speed range. The motor drive and associated control system are well adapted for use with rolling mills wherein the reel coils the strip leaving the last stand of the mill.

4 Claims, 4 Drawing Figures

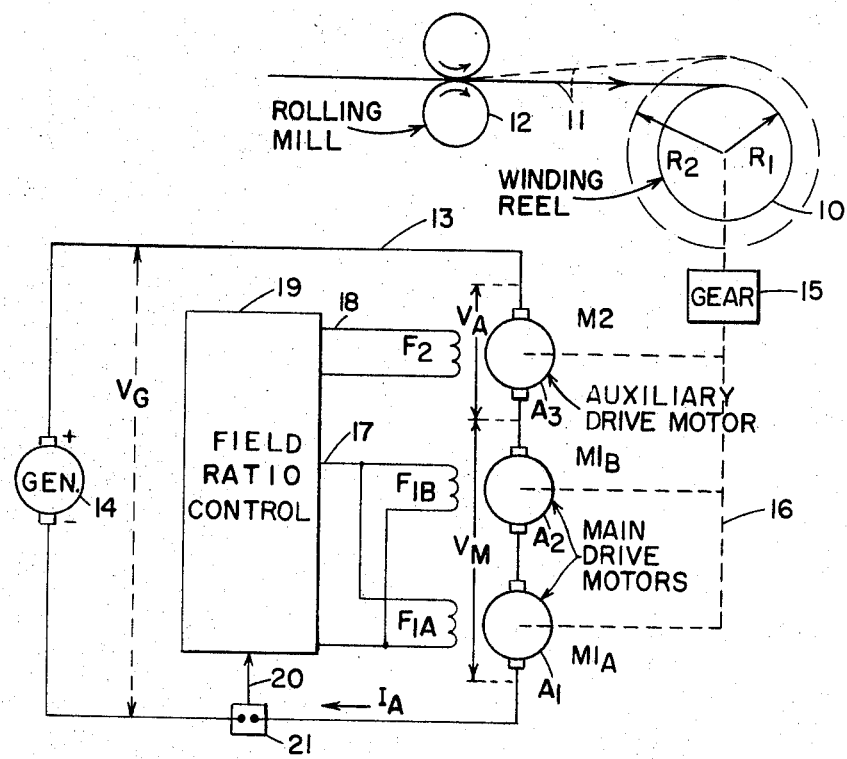

DC MOTOR DRIVE SYSTEM FOR WINDING REEL

BACKGROUND OF THE INVENTION

The present invention relates to a motor drive system for rotating loads such as winding reels, that require high output and constant horsepower over a wide range of speeds. It is particularly well suited for driving a winding reel used to coil strip material processed by a rolling mill.

Sheet metal strip processed by rolling mills is coiled at the end of the mill by a motor driven winding reel. The motor drive for the reel must be designed to maintain strip tension and speed determined by the rolling process. In modern mills where the strip speed may be of the order of 5,000 feet per minute a power drive capacity of the order of 5,000 horsepower is often required. Also, because the reel speed must vary in proportion to the radius of the coil wound thereon a wide speed range is required. Thus if the ratio of the maximum to minimum radius of the coil is seven to one, the motor drive speed range must also be seven to one. Further, if the strip speed and tension are to remain constant, the horsepower output of the motor drive must remain constant over this wide speed range. Since large DC drive motors typically have a rated speed range of between three and four to one obtainable by field control, special techniques must be resorted to for the purpose of extending the speed range of the drive system.

One such technique to extend the speed range of large size DC motors is disclosed in Marrs U.S. Pat. No. 3,132,293, issued May 5, 1964, and assigned to the same assignee as the present invention. In the Marrs system main and auxiliary drive motors are series connected to a power supply and mechanically coupled to each other and to the winding reel. By differential control of the excitation of the two motors the constant horsepower speed range may be extended by the order of two to one. However, each motor must have capacity equal to the required power output so that the total drive motor capacity is doubled with a corresponding increase in cost. Also, because large size motors typically have lower rated speeds because of design limitations caused by commutation, mass and centrifugal force problems, a higher gear ratio between the motor drive and the reel is required to rotate the reel at the required speeds. This accentuates motor overload problems caused by reflection of inertia of the reel and strip coil back into the motor drive. This effect varies with the gear ratio. Also, since the motor size is doubled the inertia of the motor drive is also doubled. Thus special and costly motor designs are required to deal effectively with transient motor overloads resulting from acceleration and deceleration of high inertia loads required to synchronize the reel with mill speed changes.

Accordingly, it is an object of the present invention to provide an improved DC motor drive system for a winding reel having an improved arrangement for obtaining constant horsepower over a wide speed range that requires less total motor capacity than the Marrs system with consequent reduction in cost.

A further object of the invention is to provide an improved DC motor drive system having the required power and speed range that reduces motor loads caused by inertia of the rotating system so that standard motor designs can be used.

A still further object of the invention is to provide a DC motor drive and control system for a winding reel that is well adapted for use with a rolling mill wherein tension and speed of strip material coiled on the reel must be precisely controlled.

Further objects and advantages of the invention will become apparent as the following description proceeds.

SUMMARY

Briefly, in accordance with the invention an improved DC motor drive system with an extended constant horsepower speed range is provided wherein a plurality of main drive motors are connected in series circuit relation with each other and with one or more auxiliary drive motors. By separately and differentially controlling the field excitation of the main and auxiliary drive motors an extended speed range is obtained. By using a plurality of main drive motors smaller sizes can be used which have inherently higher speed and speed range ratings. The higher speed permits use of a lower gear ratio between the drive system and the reel so that the effect of reel inertia reflected back to the motor drive is reduced. The higher speed range permits use of a smaller size auxiliary motor or motors so that the required total motor capacity and hence cost is reduced. A motor control system designed to utilize these characteristics advantageously is disclosed which acts to regulate, automatically, the speed and tension of strip material wound on the reel.

DESCRIPTION OF ILLUSTRATED EMBODIMENTS

Figure 1:
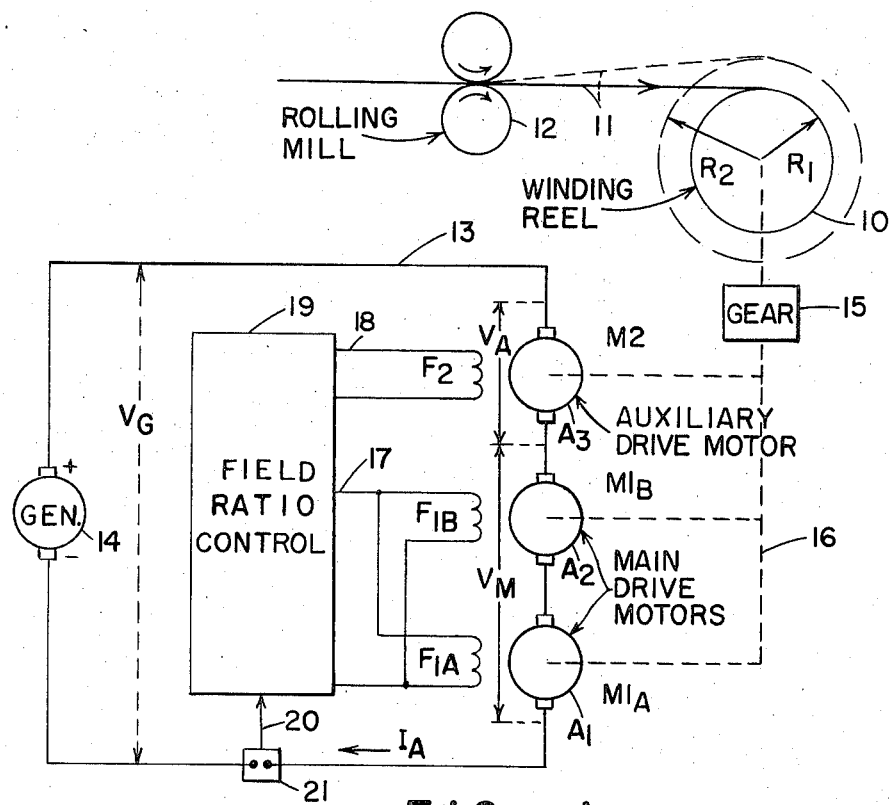
FIG. 1 is a simplified representation of a motor drive and control system for a winding reel utilizing two series-connected main drive motors which embodies the invention.

Referring now to FIG. 1 of the drawing there is shown, in simplified form, a DC motor drive system for driving a winding reel 10 used to coil strip material 11 leaving the last stand of a rolling mill 12. The drive system comprises two main DC drive motors $M_{1A}$ and $M_{1B}$ and an auxiliary DC drive motor $M_2$. All three motors are electrically connected in series circuit relation in a power supply circuit 13 energized by a source of DC power shown as a generator 14. The main drive motors $M_{1A}$ and $M_{1B}$ have armatures $A_1$ and $A_2$ and associated fields $F_{1A}$ and $F_{1B}$. The auxiliary motor $M_2$ has an armature $A_3$ and an associated field $F_2$. All three motors have rotors mechanically coupled together to drive the reel 10 through step-up gearing 15 the connection being indicated schematically by the dash line 16.

The excitation currents for the fields $F_{1A}$, $F_{1B}$ and $F_2$ of the main and auxiliary drive motors are supplied by two excitation circuits 17 and 18 which are separately controlled in a programmed manner by a field ratio control unit 19. The programming may be done by a pair of potentiometers individually controlling the two excitation circuits, the potentiometers being jointly driven by a current-responsive motor. Such an arrangement is shown, for example, in the above-mentioned Marrs patent. It will be noted that the main drive motor fields $F_{1A}$ and $F_{1B}$ are parallel connected in excitation circuit 17 so that they are simultaneously controlled whereas the auxiliary drive motor field $F_2$ is separately controlled by excitation circuit 18. The field ratio control 19 is controlled by a current responsive signal supplied by lead 20 from a current responsive device such as a shunt 21 connected in the power supply circuit 13 so as to measure total armature current $I_A$.

When the reel 10 first starts to coil strip 11, the coil will have a minimum radius $R_1$ and when the coiling operation is completed it will have a maximum radius $R_2$. If the speed of the strip is to be maintained constant, it is apparent that the motor drive system must have a ratio of maximum to minimum speeds equal to $R_2/R_1$. Also, if constant tension is to be maintained in the strip, the horsepower delivered by the drive system will have to be constant over this speed range.

The maximum speed range obtainable from large size drive motors by field control alone is typically in the range of three or four to one, whereas the $R_2/R_1$ coil size ratio may be of the order seven to one. It is apparent, therefore, that a system must be provided to extend the constant horsepower speed range of the drive system. This is accomplished by separate control of the excitation currents supplied to main and auxiliary drive motors under the programed control of the field ratio control unit 19. When the coil size is minimum at radius $R_1$, the motor drive speed must be maximum. For this condition, the excitation of main motor fields $F_{1A}$ and $F_{1B}$ is a minimum (weak field) and the excitation of auxiliary motor field $F_2$ is zero. The main motors then operate at maximum rated. As the coil builds up current signals on lead 20 will call for a gradual reduction of speed. This is done by a gradual increase of excitation current in circuit 17 until the fields $F_{1A}$ and $F_{1B}$ have maximum excitation. The motors $M_{1A}$ and $M_{1B}$ will then have minimum rated or base speed. As the coil continues to build up, the current in excitation circuit 18 is gradually increased until the excitation of auxiliary motor field $F_2$ reaches a maximum rated value. At that point the coil will have reached its maximum size at radius $R_2$ and the motors will be operating at minimum speed which is lower than the rated speed of the individual drive motors. This occurs because after the motor $M_2$ is excited, the voltage $V_M$ across the main drive motors $M_{1A}$ and $M_{2B}$ becomes less than the generator voltage $V_G$ by the amount of the voltage $V_A$ across the auxiliary motor $M_2$. This reduction in main motor armature voltage causes a reduction in speed and power. However, the net power delivered by the drive system remains constant because the power output of motor $M_2$ is algebraically added to that of motors $M_{1A}$ and $M_{1B}$ due to the mechanical intercoupling of the motors.

The above described motor drive system is to be distinguished from the system disclosed in the above-mentioned Marrs patent in that a plurality of series-connected main drive motors is used in combination with a smaller size series connected auxiliary drive motor with simultaneous control of the fields of the main drive motors. The Marrs system utilizes only one main drive motor with the auxiliary and main drive motors having equal power, each motor having sufficient power in itself to drive the winding reel. The advantage of the present invention over the Marrs system will become clear from the following examples of applications of the two systems. It will be assumed that the reel drive requires 5,000 horsepower with a speed range of seven to one to wind a coil of 115.5 inches maximum diameter from a 16.5 inches minimum diameter at 5,000 feet per minute. For this coil size the minimum reel speed will be 165 RPM.

The Marrs system would require two 5,000 hp motors having a combined capacity of 10,000 hp. Typical speed ratings for such motors at 700 volts would be 80/280 RPM, with an extended speed range of 40/280 RPM. In this case, gears 15 would have a speed-up ratio of 165/40 or 4.13 to 1.

In the system of FIG. 1, three identical motors $M_{1A}$, $M_{1B}$ and $M_2$ could be used with each having a capacity of 2500 horsepower for a total combined horsepower of 7,500. Typical speed ratings for such motors at 350 volts would be 110/512 RPM with an effective speed range of 73.5/512. In this case the gears 15 would have a speed-up ratio of 165/73.3 or 2.25/1.

In comparing the two systems it will be noted that the system of FIG. 1 requires 2,500 hp less in total capacity rating with a corresponding saving in cost and motor inertia. Further, it will be noted that because the smaller size motors have inherently higher speed the speed-up gear ratio is less by a factor of 4.13/2.25 or 1.83/1. Since the reel coil inertia torque reflected back to the motor varies as the square of the speed, the difference between the two systems is $(4.13)^2/(2.25)^2 = 3.35$. In other words, with the system of FIG. 1 the coil and reel inertia torque reflected back into the drive system is only about one-third as large with a corresponding reduction in overload torques during acceleration and deceleration of the drive system. Due to reduced inertia torque on the drive, standard motor overloads may be used to meet the accelerating and decelerating requirements for a modern reel installation on a rolling mill.

Figure 2:
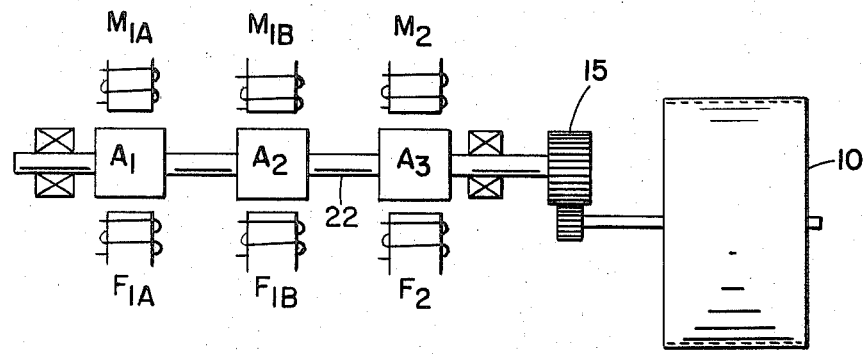
FIG. 2 illustrates a preferred coupling arrangement for the motors illustrated in system of FIG. 1.

While the drive motors $M_{1A}$, $M_{1B}$ and $M_2$ may be coupled together in any suitable manner the arrangement of FIG. 2 has advantages of lower cost and reduced motor inertia. Here it will be noted that the three motor armatures $A_1$, $A_2$ and $A_3$ are mounted on a common shaft 22 and are incorporated with the associated fields $F_{1A}$, $F_{1B}$ and $F_2$ into a single dynamoelectric machine. This arrangement eliminates gearing that would otherwise be required to couple the motors together.

Figure 3:
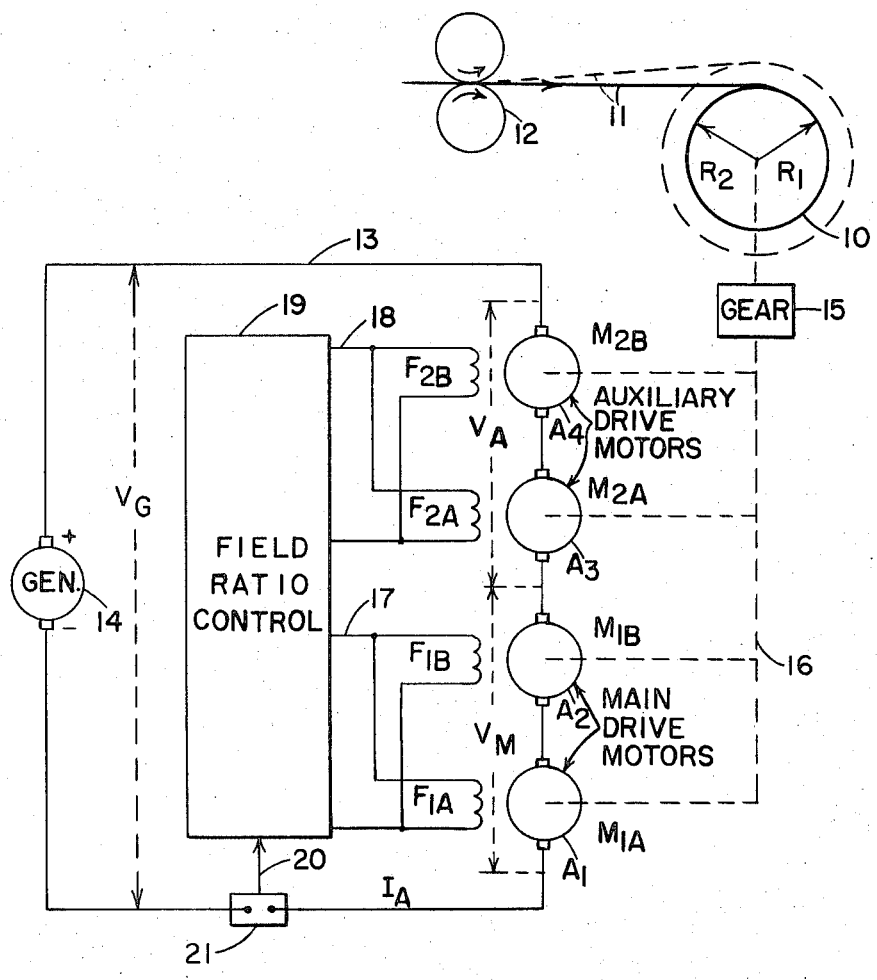
FIG. 3 is a modified arrangement wherein two series-connected main and two series-connected auxiliary drive motors are used.

The invention is not limited to the use of two main drive motors as a greater number may be used depending on cost factors and other design considerations. Also, more than one auxiliary drive motor may be used if desired and such a system is shown in FIG. 3. Here the system is similar to FIG. 1 except that two auxiliary drive motors $M_{2A}$ and $M_{2B}$ having armatures $A_3$ and $A_4$ are used. They have associated fields $F_{2A}$ and $F_{2B}$ which are controlled simultaneously by excitation circuit 18. In this case as in FIG. 1, all of the main and auxiliary drive motors are series connected in power circuit 13 and mechanically coupled together. Here the excitation of motors $M_{2A}$ and $M_{2B}$ and, consequently, the voltage $V_A$ across them would remain at zero until after the main motors $M_{1A}$ and $M_{2A}$ receive full excitation and achieve their rated speed.

Figure 4:
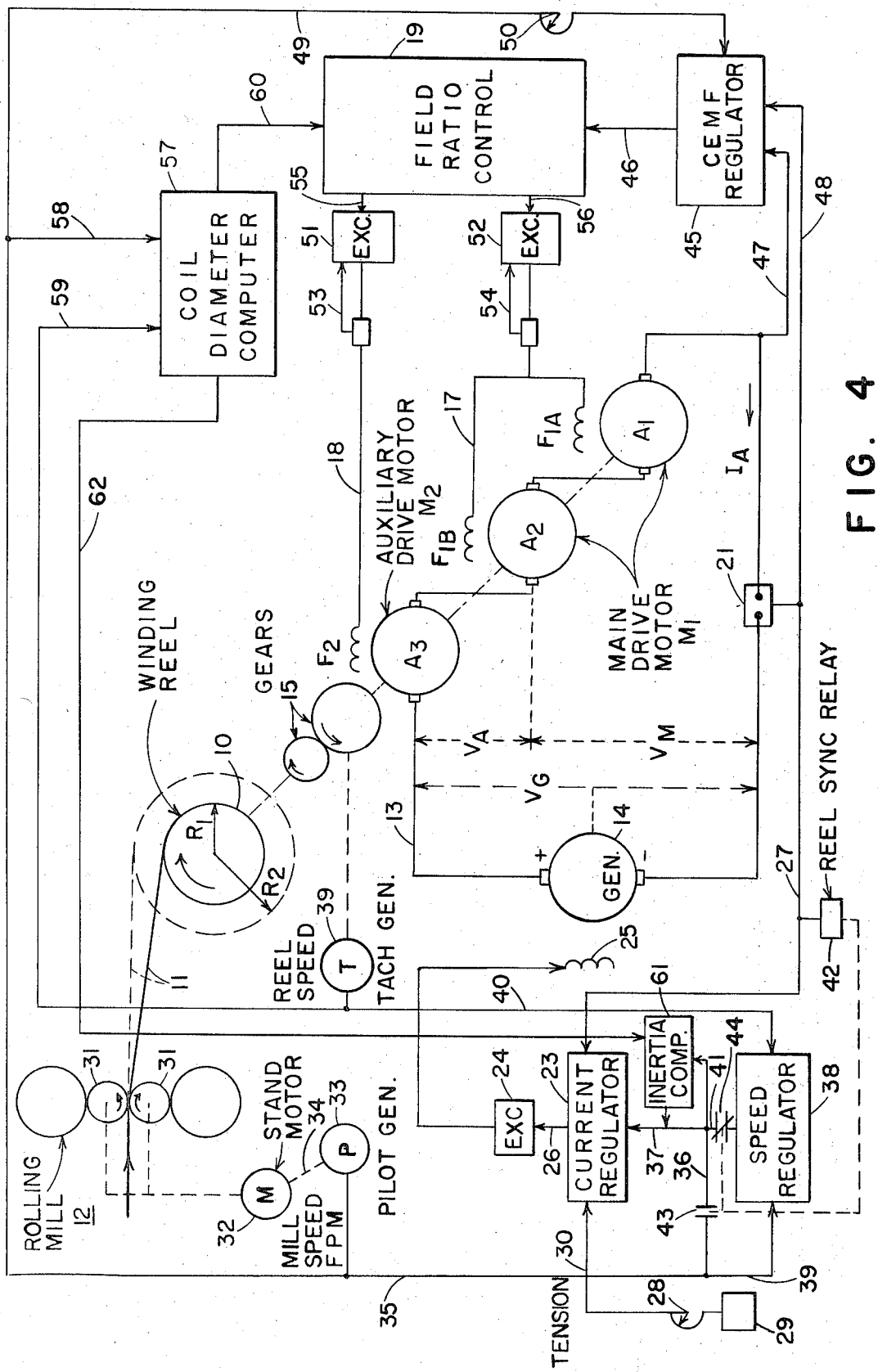
FIG. 4 illustrates in greater detail a control system wherein the drive motor arrangement of FIG. 1 may be used to control precisely the speed and tension of strip material coiled on the winding reel.

In FIG. 4 of the drawing, there is shown in a one line diagram a control system for the motor drive arrangement of FIG. 1 which operates to maintain strip tension at preset values for various strip speeds. This system is well adapted for use with a rolling mill where the speed of the strip must be synchronized with the speed of the mill and the strip tension must be maintained at some predetermined value called for by the rolling process. In this system, the motor armature current $I_A$ which affects the tension of strip 11 is regulated by a current regulator 23 controlling excitation current supplied by an exciter 24 to field 25 of power supply generator 14 thereby controlling the voltage and current of power supply circuit 13. The exciter 24 maintains the excitation level set by an input signal on lead 26. Current feedback to the regulator is supplied by lead 27 from shunt 21.

For the purpose of adjusting the strip tension maintained by the current regulator, there is provided a tension control 28 in the form of a potentiometer which adjusts the magnitude of a reference voltage from a voltage source 29 supplied to the current regulator via lead 30.

The rolling mill 12 is shown as having a pair of working rolls 31 driven by a stand motor 32 and which feed the processed strip 11 to the winding reel 10. Whenever there is a change in mill speed, there must also be a corresponding change in the reel speed to prevent looping or breaking of the strip. To provide such adjustment automatically, there is provided a pilot generator 33 driven by stand motor 32 through a drive connector 34 which produces a FPM signal indicative of the mill exit speed of strip 11. This FPM speed signal is fed to the current regulator 23 via leads 35, 36 and 37 to change the voltage and current of the power supply circuit and hence speed of the motors driving the reel 10 in a direction to synchronize the reel and mill speeds. During the initial threading of the strip on the reel, there is very little current drawn by the drive motors so that additional control is needed to synchronize the reel to mill speed. For this purpose, there is provided a speed regulator 38 which is operative only during the start up operation. It receives an FPM mill speed signal via lead 39 and a reel speed feedback signal via lead 40 from a tachometer generator 39 driven by the reel. The speed control signal reaches regulator 23 by way of leads 41 and 37. After the threading of the strip has been completed and during normal operation the speed regulator is removed from the control circuit loop by a current sensitive relay 42 responsive to current $I_A$ in the motor armature circuit. This relay operates normally open contacts 43 and normally closed contacts 44 to short out the speed regulator.

In this system the field ratio control 19 receives a field control signal from a counter electromotive force regulator 45 hereinafter referred to as the CEMF regulator via lead 46. The CEMF regulator receives as inputs a power supply voltage signal $V_G$ via lead 47, a motor current signal $I_A$ via lead 48 and an FPM speed signal via lead 49. It operates to maintain a constant CEMF of the drive motors by adjusting the drive motor excitation in a well known manner. An adjustment potentiometer 50 is provided for initial setting of the regulator.

In response to field control signals from the CEMF regulator on lead 46 the field ratio control 19 controls the relative magnitudes of the excitation currents in circuits 17 and 18 controlling the main and auxiliary drive motor fields $F_{1A}$, $F_{1B}$ and $F_2$ in a manner similar to that already described in connection with FIG. 1. In this case, the control is through exciters 51 and 52 having the usual feedback circuits 53 and 54 for maintaining the excitation levels called for by the control signals supplied to input leads 55 and 56. Also, in this case, the programing of the excitation currents as between the fields of the main and auxiliary drive motors is controlled by a coil diameter computer 57 which will now be described.

The coil diameter computer is essentially a variable ohmic switching device which receives as inputs mill speed and reel speed signals from signal generators 33 and 39 via leads 58 and 59. During the windup of the strip 11 on reel 10 the RPM of the reel as compared with the RPM of the mill rolls 31 will vary with the radius of the coiled strip on the reel. Therefore, the difference in these two speed signals can be taken as a measure of the diameter of the coil. The coil size can in turn be correlated with the desired distribution of the excitation of the motor drive system as between the main and auxiliary drive motors to achieve the desired motor speeds for constant power output. For this purpose, the coil diameter computer provides a coil size signal on lead 60 to control the programing of the field ratio control.

During operation of the rolling mill, the mill speeds may change suddenly and under those conditions large accelerating or decelerating torques must be applied by the reel drive motors in order to maintain speed synchronization of the reel. To accomplish this, the mill speed signals supplied to current regulator 23 via lead 37 are momentarily augmented or diminished, as the case may be, by the addition or subtraction to or from the speed signal of a first derivative or rate signal supplied by an inertia compensator 61. This rate signal is generated by the use of RC networks in a well known manner. Since the amount of acceleration or deceleration torque needed for reel speed tracking varies with the coil size and hence inertia of the reel, the rate signal is varied to correspond with the total reel inertia which also includes the fixed inertia of the reel, gear and motor. For this purpose, a coil diameter signal is fed from the coil diameter computer 57 to the inertia compensator via lead 62 to achieve the desired compensation.

While there have been shown what is presently considered to be preferred embodiments of the invention, it will be apparent to those skilled in the art that various changes and modifications may be made therein without departing from the spirit and scope of the invention.

What is claimed as new and desired to be secured by letters patent of the United States is:

1. A DC motor drive system for driving at constant horsepower over an extended speed range a winding reel adapted to coil thereon strip material, said system comprising:
   a. a plurality of DC main drive motors each having an armature and an associated field, said main drive motors having a combined horsepower sufficient to drive the reel over their rated speed range with the required tension of the strip material coiled on said reel,
   b. auxiliary DC drive motor means comprising at least one motor having an armature and an associated field, c. coupling means mechanically coupling said main and auxiliary drive motors to rotate together and to drive the winding reel,
d. an armature circuit electrically connecting all of the armatures of said main and auxiliary motors in series circuit relation to a source of DC power,
e. a first excitation circuit for simultaneously varying the excitation current supplied to the fields of main drive motors,
f. a second excitation circuit for separately varying the excitation current supplied to the field or fields of the auxiliary drive motor means, and
g. excitation control means responsive to the flow of current in said armature circuit for controlling the relative magnitude of the excitation currents flowing in said first and second excitation circuits to vary the constant horsepower speed of the drive system over a speed range greater than the rated speed range of the drive motors.

2. The drive system as set forth in claim 1 wherein two main and one auxiliary drive motors are utilized all of which have the same speed range and power ratings.

3. The drive system as set forth in claim 1 wherein the rotors of the main and auxiliary motors are mounted on a common shaft.

4. The drive system as set forth in claim 1 wherein the field excitation control means acts to first supply zero field to the auxiliary motor means while the field of the main drive motors is increased through the normal speed range of said main drive motors and then acts to increase the field of the auxiliary drive motor to extend the speed range of the drive system.

* * * * *